United States Patent [19]
Bakosch

[11] Patent Number: 5,639,498
[45] Date of Patent: Jun. 17, 1997

[54] METHOD AND APPARATUS FOR MANUFACTURING FOOD PRODUCTS SUCH AS PANCAKES, WAFFLES AND MEATBALLS

[76] Inventor: Laszlo Bakosch, Solängen 39, Trelleborg S-231 93, Sweden

[21] Appl. No.: 505,274

[22] PCT Filed: Nov. 30, 1994

[86] PCT No.: PCT/SE94/01149

§ 371 Date: Jul. 28, 1995

§ 102(e) Date: Jul. 28, 1995

[87] PCT Pub. No.: WO95/15107

PCT Pub. Date: Jun. 8, 1995

[30] Foreign Application Priority Data

Dec. 2, 1993 [SE] Sweden .................... 9304010

[51] Int. Cl.[6] .................................. A47J 43/20
[52] U.S. Cl. .............. 426/391; 426/144; 426/745; 426/445; 426/465; 426/496; 426/515; 426/523; 426/524; 99/374
[58] Field of Search ...................... 426/144, 245, 426/279, 280, 391, 443, 445, 465, 496, 505, 512, 552, 515, 528, 544, 653; 99/374; D7/352, 410; 264/297.2, 297.4

[56] References Cited

U.S. PATENT DOCUMENTS

| | | | |
|---|---|---|---|
| 1,369,272 | 2/1921 | Edison | 264/297.4 X |
| 1,639,440 | 8/1927 | Smith | 425/338 X |
| 3,669,601 | 6/1972 | Lainesse | 425/234 X |
| 4,803,918 | 2/1989 | Carbon et al. | 99/374 X |
| 4,970,949 | 11/1990 | Ferrara, Jr. et al. | 99/374 |
| 5,299,492 | 4/1994 | Carbon et al. | 99/374 X |

FOREIGN PATENT DOCUMENTS

| | | |
|---|---|---|
| 1583781 | 12/1969 | France . |
| 2543406 | 10/1984 | France . |
| 8703462 | 6/1987 | WIPO . |

*Primary Examiner*—Milton Cano
*Attorney, Agent, or Firm*—Tarolli, Sundheim, Covell, Tummino & Szabo

[57] ABSTRACT

A method and device for manufacturing food products where the product material, initially in a substantially liquid state, is fed into the device and through the supply of heat or cold is given its final, substantially solid state, the device comprises elements capable of being moved apart as well as brought together, having at least one recess on at least one side of each element so that the sides facing each other are mounted close to each other and define between them at least one product-forming space.

29 Claims, 7 Drawing Sheets

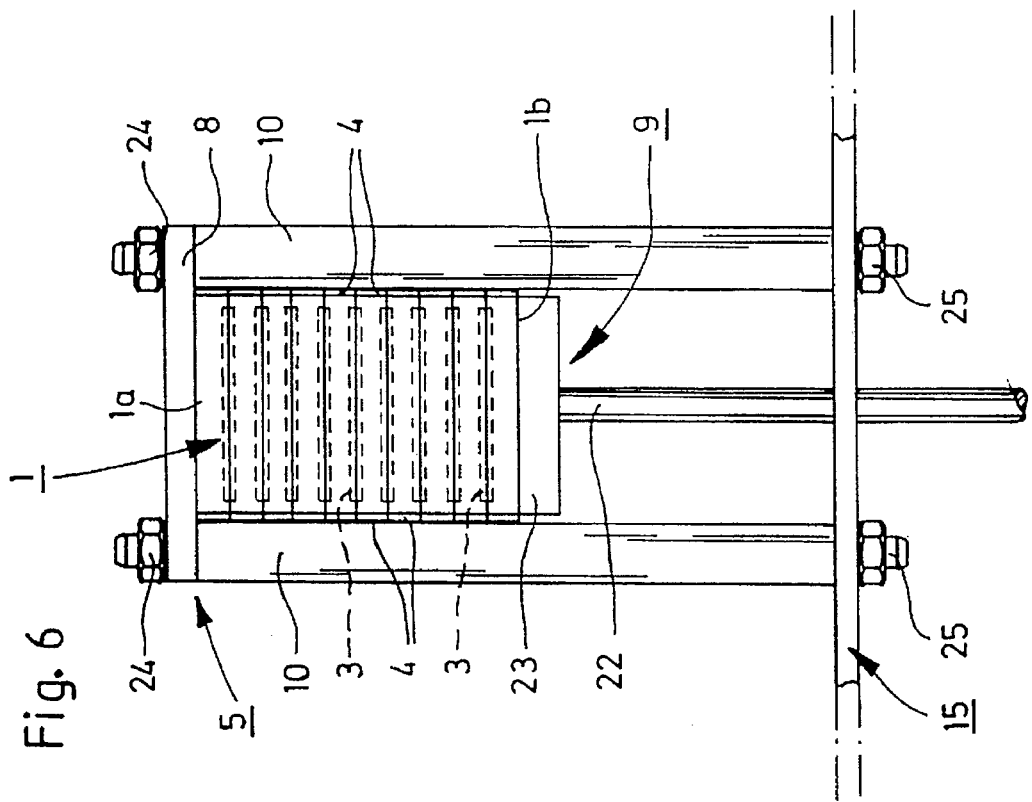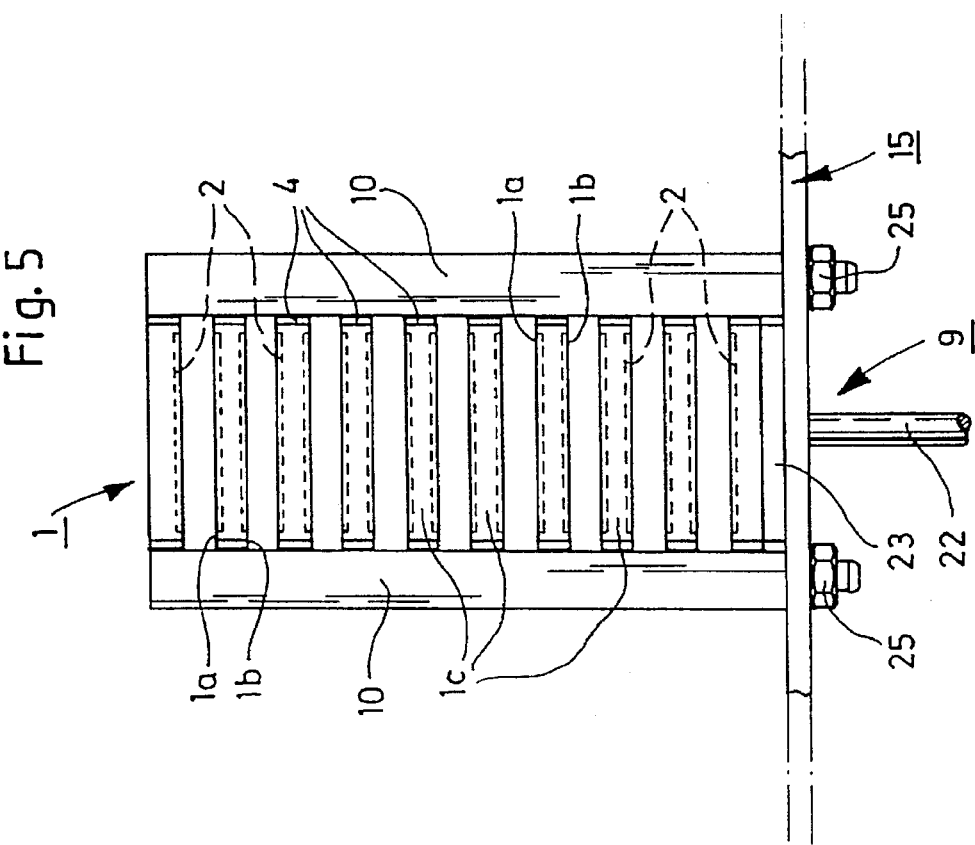

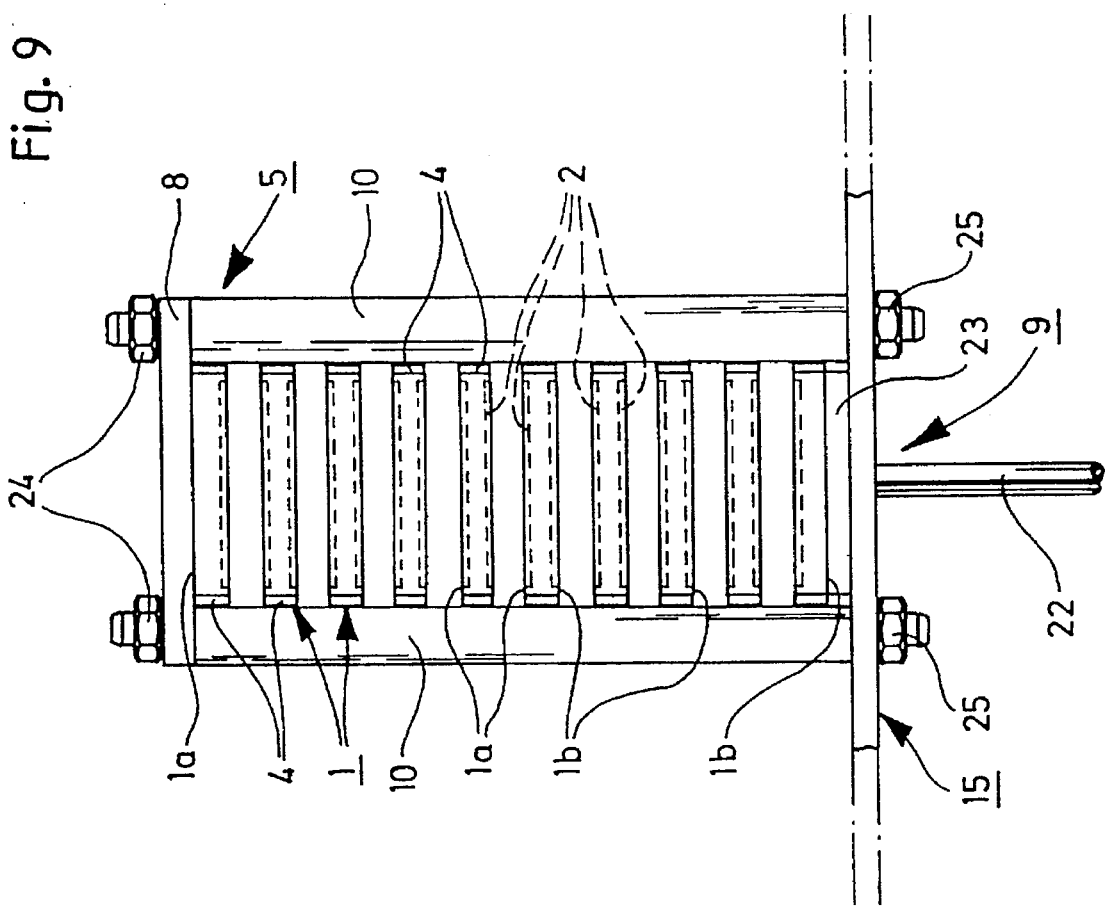

METHOD AND APPARATUS FOR MANUFACTURING FOOD PRODUCTS SUCH AS PANCAKES, WAFFLES AND MEATBALLS

The present invention relates to a method and a device for manufacturing products, preferably food products such as pancakes, waffles, meat balls etc., where the product material initially in a more or less liquid state is fed into the device and through the supply of heat or cold is given its final, more solid state.

Food products such as pancakes, waffles, meat balls and similar have hitherto not been manufactured in a rational manner. The production has required either several persons and much equipment, which made the products expensive, or has taken a long time, which, when a large number of the products shall be made, is unacceptable.

The object of the present invention is therefore to provide a method and a device which permit rational production also of large amounts of particularly food products such as pancakes, waffles, meat balls etc.

This object is arrived at while the method is characterized by the fact that elements between which the products are to be formed, are located close to each other in the device according to the invention; that the elements located close to each other are brought together; that the product material is injected into product-forming spaces defined between the elements during the bringing together thereof; that heat or cold is supplied to the elements for forming the products by heating or cooling the product material in the spaces between the elements; that the elements are moved apart when the products are finished to provide access to the products; and that the finished products are removed from the elements.

The device for carrying out this method comprises elements which can be located close to each other and be moved apart as well as brought together, and which have at least one recess on at least one side of each element so that the sides facing each other on two elements mounted close to each other between them define at least one product-forming space, whereby each element includes at least one guide portion which cooperates with a guide means for locating the elements in a correct space-defining position close to each other and guiding the elements while they are moved apart or brought together, whereby each element includes at least one feed portion for injecting the product material into the spaces between the elements by means of a feed device, whereby the elements include heating and/or cooling means for heating or cooling the product material in the spaces between the elements, whereby the guide means includes a limit stop against which the elements are pressed by means of a driving device for bringing the elements together when the product material is injected into the spaces therebetween, and whereby the guide means also includes at least one stop means which the guide portions of the elements are brought to engage when the elements are moved apart for removal of the finished products.

The device according to the invention can be operated by one person, despite its very high capacity, since the device can be operated fully automatically. Thus, the products are cheap to manufacture. The method and device according to the invention may also, as stated above, be used for other products than food, e.g. stearine candles.

The abovementioned and other characterizing features of the invention and the advantages therewith will be further described below with reference to the accompanying drawings, wherein FIG. 1 is a perspective view of two elements for the device according to the invention;

FIGS. 5–9 illustrate an embodiment of the device according to the invention after location or mounting of the elements and during the different steps in the method according to the invention.

Figure 1:
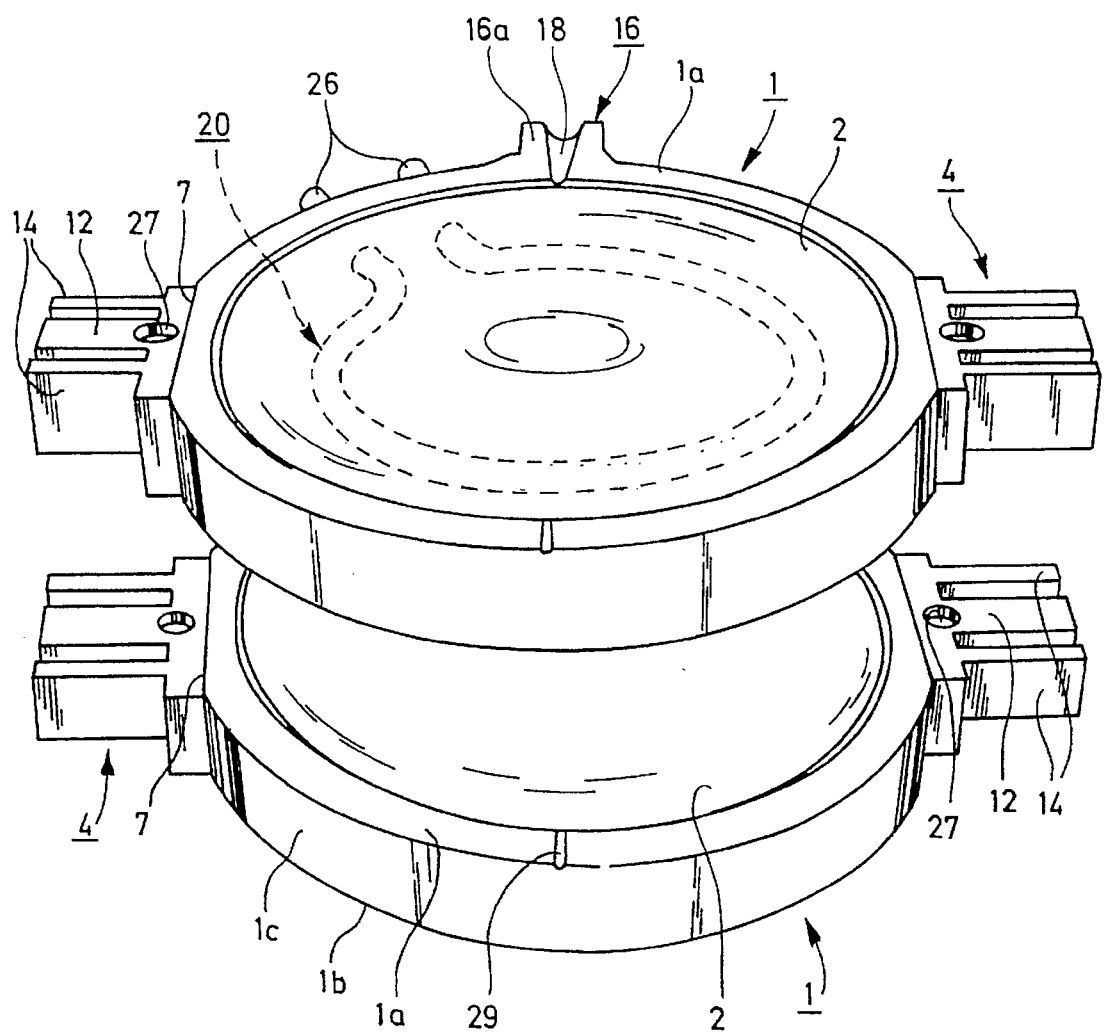
Figure 3:
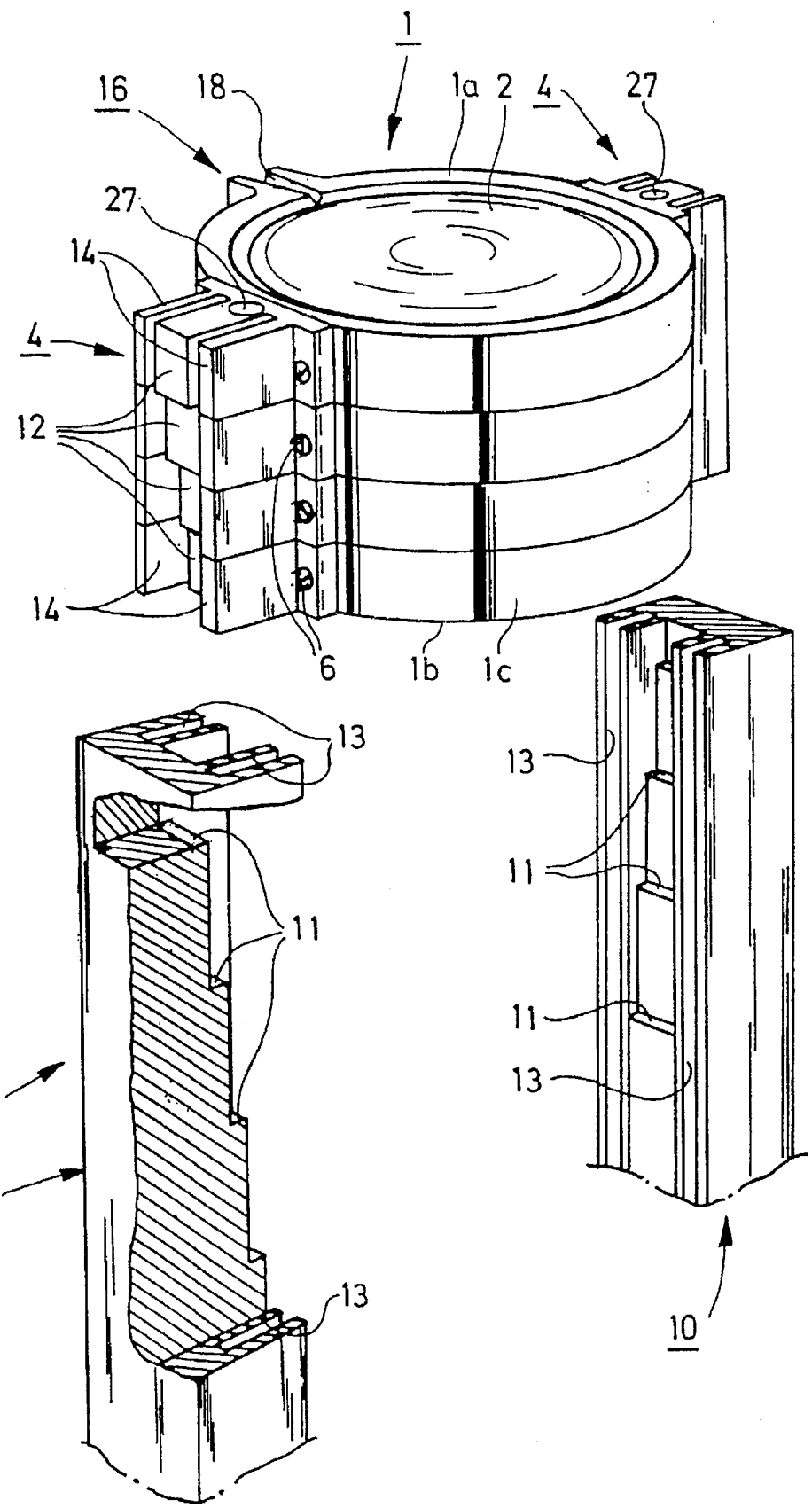
FIG. 3 illustrates schematically, with an exploded view and in perspective, four elements in a position where they are brought together for injection of product material.
Figure 4:
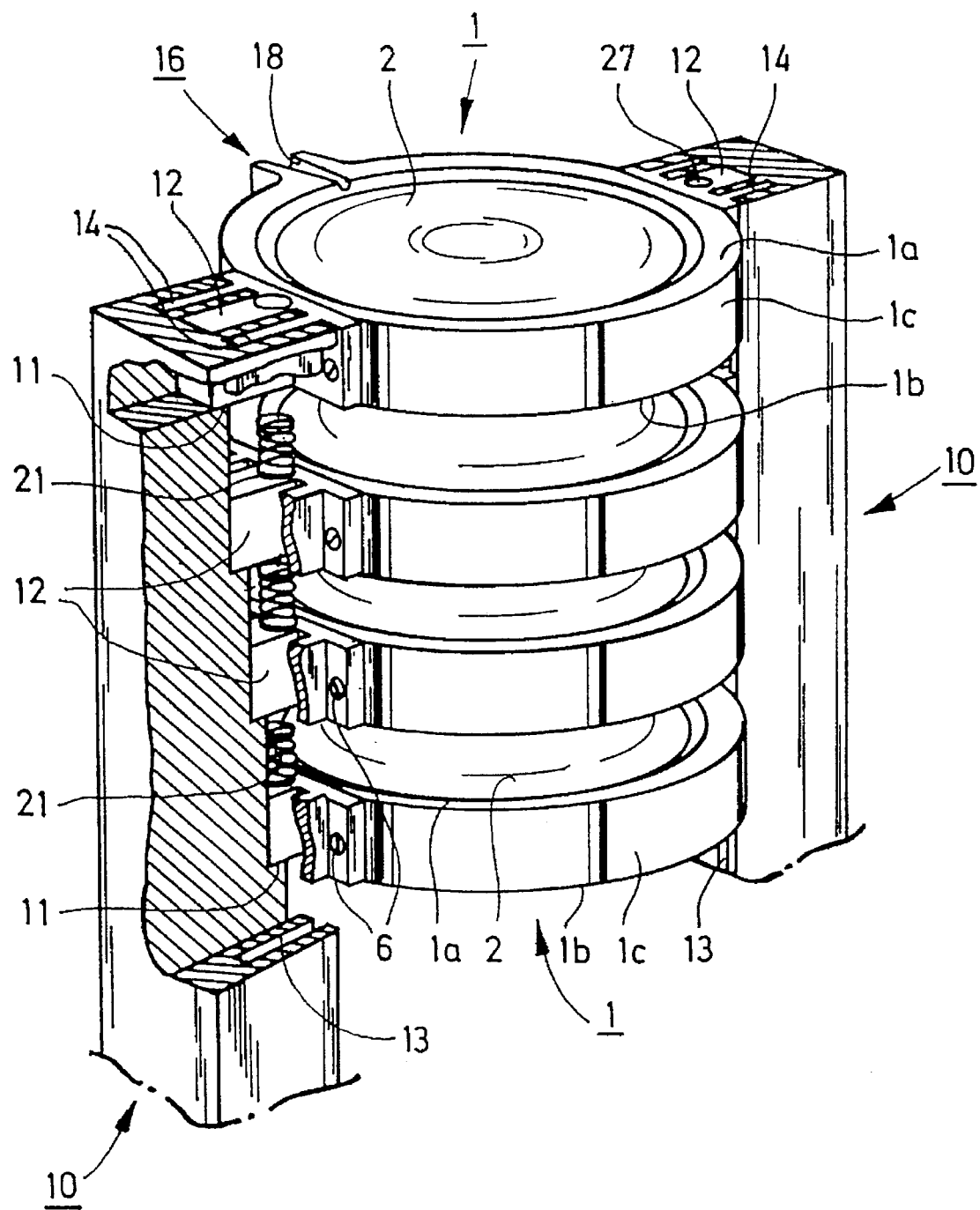
FIG. 4 is a view corresponding with FIG. 3, but illustrates the elements moved apart for removal of finished products.

Thus, FIG. 1 illustrates in perspective two elements 1 for the device according to the present invention. At least two, preferably a plurality of such, preferably disc shaped elements 1 are located close to each other, preferably stacked above or on top of each other in the device (see FIGS. 3–9). Each element 1 has at least one recess 2 on at least one of its sides 1a or 1b, preferably at least one recess 2 on both sides thereof. Thus, two elements 1 located close to each other define, when they are brought together, at least one product-forming space 3 therebetween (see FIG. 3 or 6), into which material in more or less liquid state for the manufacture of products in more solid form, preferably food products such as pancakes, waffles, meat balls etc., is injected. The elements 1 can also be moved apart relative to each other (see FIG. 4, 8 or 9).

In order to locate the elements 1 in the correct position for defining one or more spaces 2 with adjacent elements 1 when said elements are placed close to each other or above or on top of each other, and for guiding the elements during moving apart and bringing together thereof, each element further includes at least one guide portion 4 which cooperates with a guide means 5 in the device according to the invention. In the embodiment shown, each element 1 includes two guide portions 4 which are located preferably diametrically opposed on the element and which are preferably releasably mounted thereon. The guide portions 4 can be mounted on the elements 1 and released therefrom by means of attachment means of a suitable type, e.g. screws 6. Portions 7 of the here round outer side 1c of the disc shaped elements 1 are for this purpose, in the embodiment shown, bevelled and provided with screw holes (not shown). Alternatively, the guide portions 4 may of course be given a correspondingly curved or another shape adapted to the shape of the elements 1. Since the guide portions 4 can be unscrewed, any element 1 may after unscrewing be removed from the element stack for cleaning, repair or exchange.

Figure 7:
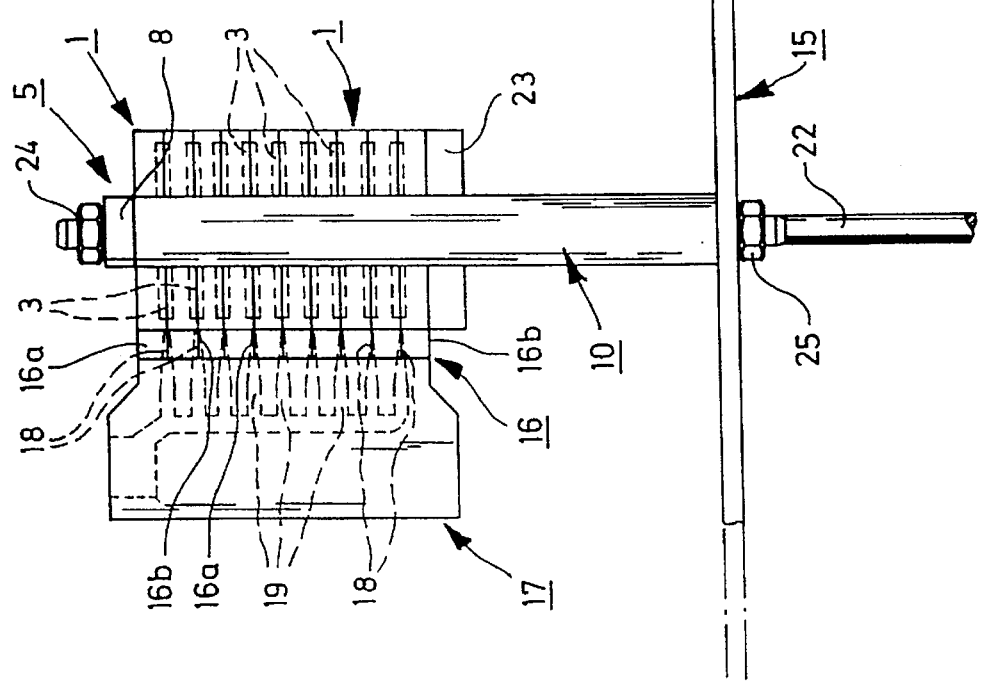

The guide means 5 which is elongated and extends along all elements 1, in the embodiment shown, along the entire element stack, has in one end a limit stop 8, secured preferably by means of a screw joint 24, against which the elements 1 are pressed by means of a driving device 9 for bringing together said elements when product material is injected into the spaces 3 between said elements (FIGS. 6 and 7). The limit stop comprises, in the embodiment shown, a stopping portion 8 having a suitable shape for the purpose and provided at the top of the guide means 5, whereby the elements 1 are pressed from below, i.e. from the opposite end of the element stack, against the stopping portion 8 by means of said driving device 9. It should also be noticed that the side of the uppermost and lowermost element 1 respectively, facing the limit stop 8 and the driving device 9 respectively, can be smooth or flat.

The guide means 5 also includes at least one stop means 10, which the guide portions 4 of the elements 1 are brought to engage when said elements 1 are moved apart for removal of the finished products. Thus, in the embodiment shown, the two stop means 10 connected inter alia through the limit stop 8, both have stop surfaces 11 for stop members 12 on the guide portions 4 on each element 1, which stop members 12 with their lower sides 12a are brought into engagement with the stop surfaces 11 during moving apart of the elements (see FIG. 4). Each stop means 10 is preferably stepped and has a stop surface 11 on every step, and the stop members 12 of the guide portions 4 are preferably defined by protruding flanges of different length for engagement with said stop surfaces 11. At the illustrated stacked arrangement of elements 1 above or on top of each other, the stop members 12 will thereby engage the stop surfaces 11 from above and rest thereon with the whole weight of the respective element. The depth of the steps or stop surfaces 11 may vary as required or desired and the length of the flanges or stop members 12 are also adjusted in relation to the step depth. Additionally, the stop surfaces 11 are located at such distance from each other that the distance between the elements 1, when the stop members 12 on the guide portions 4 thereof rest on said stop surfaces, is preferably about 50 mm, since this has been shown to be a suitable distance for simple access to and removal of the finished products by hand as well as automatically. If the element 1 is e.g. about 20 mm thick, the step height is thus about 70 mm (see FIGS. 4 and 9). In the illustrated preferred embodiment, grooves 13 are provided in each stop means 10 in the guide means 5, and fingers 14 in the guide portions 4 of the elements 1 protrude into said grooves and guided therein (see FIGS. 3 and 4). The grooves 13 are defined at one end by the limit stop 8 and at the other end by a frame member 15 carrying the guide means 5. The grooves 13 are here provided also on the sides of the stop surfaces 11 of each stop means 10 and the fingers 14 correspondingly provided on the sides of the stop member 12 of each guide portion 4.

Figure 2:
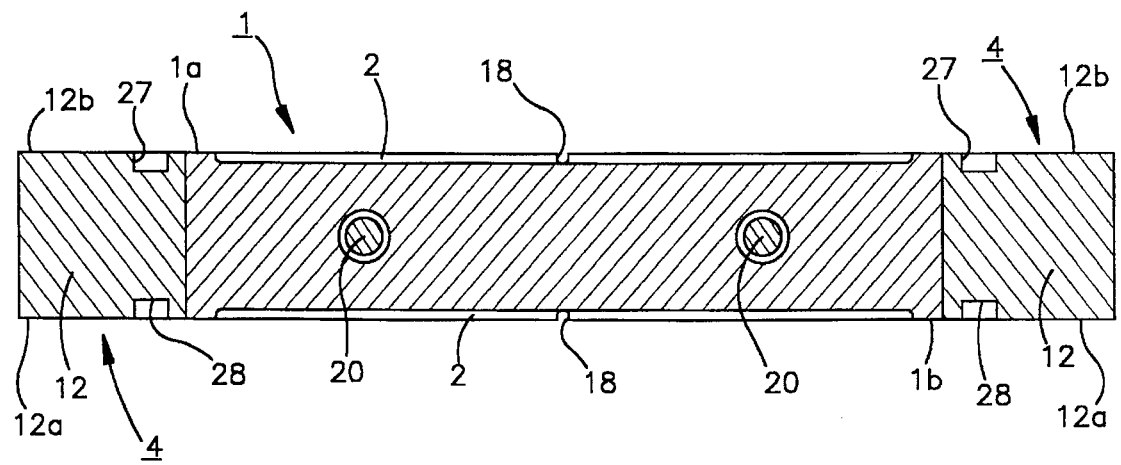
FIG. 2 is a section through one of the elements in FIG. 1.

Each element 1 further includes, preferably integral therewith, at least one feed portion 16 for injecting product material in more or less liquid state into the spaces 3 between the elements by means of a preferably fully automatically operating feed device 17 (see FIG. 7). Each feed portion 16 comprises at least one groove 18, a passage or similar which extends between the outer side 1c of the element 1 for connection with the feed device 17 for the product material, e.g. for insertion into the grooves or passages of spray or injection nozzles 19 on the feed device 17, and each recess 2 in the element 1 (FIGS. 1 and 2). If there is more than one recess 2 on any element side 1a, 1b, the groove 18 or passage branch off to each recess or are the recesses connected with each other in any suitable way. The feed portion 16 on each element 1 is, in the embodiment shown, provided with a groove 18 in the upper side 16a as well as in the lower side 16b, but the lower side 16b can also be smooth, particularly the lower side 16b of the feed portion 16 on the lowermost element closest to the driving device 9, as can the upper side 16a of the feed portion 16 on the uppermost element 1 closest to the limit stop 8. When bringing together two elements 1, the groove 18 in the lower side 16b of the feed portion 16 on one element cooperates with the groove 18 in the upper side 16a of the feed portion 16 on the other adjacent element or the element down below, whereby the two feed portions 16 define a passage therebetween. The grooves 18 or passages have such a shape and size that there is no risk for blockage thereof because of remaining product material. Hereby, the consistency of the product material and the rate at which the material is injected are of importance, and necessary adjustment of these parameters therefore occurs as required, so that blockage of grooves/passages is prevented. The feed device 17 is also, in a manner not shown, connected with a source of product material (not shown) for the supply thereto of product material by means of feed means (not shown), and displaceably mounted in a suitable way. Preferably diametrically opposite to the groove or grooves 18, each element 1 further comprises at least one smaller groove 29 (see FIG. 1 which also runs between the outer side 1c of the element and the recess or recesses 2 in the element. These grooves 29 are provided for the release of air from the space or spaces 3 when product material is injected thereinto. Otherwise, the air will be trapped in the space or spaces 3 and lead to incomplete filling thereof. If the elements are located on end, fat and other things which otherwise are gathered in the spaces 3 can flow out through these grooves 29.

Each element 1 further includes heating and/or cooling means 20 for heating or cooling the product material in the spaces 3 between the elements 1 (see FIG. 1)The heating and/or cooling means e.g. consists of, as in the embodiment shown, in each element 1 located coils 20 of heat conducting material and/or pipes for cooling medium. Heating or cooling occurs in a suitable, not further illustrated manner by connection (through couplings 26) with sources of current and/or sources of cooling medium (not shown).

Figure 8:
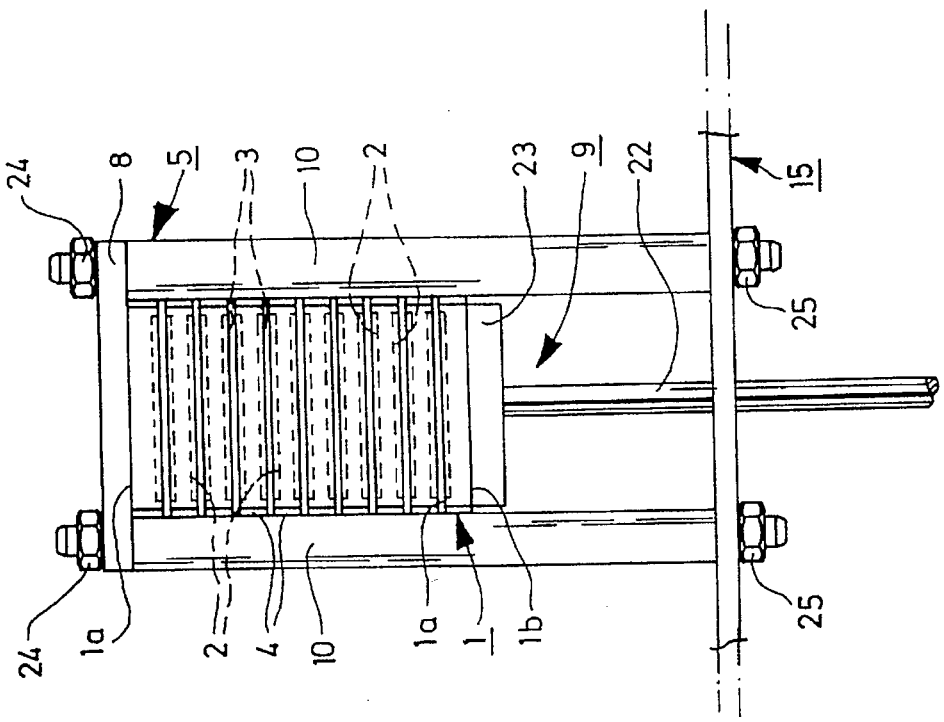

The elements 1 preferably also comprise distance-providing means 21 (see FIG. 4) for moving the elements 1 apart a first distance to permit swelling of the injected product material when said material is heated or cooled during forming of the products (FIG. 8). Thus, when the elements 1 by means of the driving device 9 are pressed against the limit stop 8 of the guide means 5 for injection of the product material, this occurs against the action of the distance-providing means 21. The driving device 9, which in the drawings comprises a preferably motor-driven, by means of a rod 22 vertically displaceable, in the guide means 5 movably mounted and with the lowermost element 1 engageable member 23 and which is also operable to affect the elements with, in the illustrated preferred embodiment, upwardly directed force which is larger than the force from the distance-providing means 21, is consequently also retractable to such a degree that the distance-providing means are allowed to move apart or separate the elements said first distance. The distance-providing means are preferably made up of spring means 21, which are mounted on each element 1 and protrude upwards therefrom, and which are adapted to keep the element on which they are mounted apart or separated said first distance from the element located thereabove (FIG. 8). The spring means each consist of a spring 21, which is mounted preferably in a seat 27 in each guide portion 4 on the element 1, particularly on the upper side 12b of the stop member 12 of said guide portion, and which with its free end engages the corresponding guide portion 4 on the element immediately thereabove, i.e. preferably the lower side 12a of the stop member 12 of this guide portion and thereby eventually in a seat 28 provided therefor. The prestressing of the spring means 21 vary in dependence of the number of elements 1 located thereabove, such that the farther down in the stack an element is located and the more elements there are provided on top thereof, the larger prestressing the spring means have. The prestressing is sized so that all elements 1 are kept apart by the spring means 21 preferably about 1 mm from each other, since this distance has been shown to function well for permitting the required swelling of the product material in the spaces 3 while the material is heated, such as e.g. batter for pancakes, waffles etc., or cooled, such as liquid stearine.

The displaceable member 23 of the driving device 9 is also retractable so that its influence on the elements 1 ceases and the guide portions 4 of the elements, preferably their stop members 12, are brought into engagement with, i.e. rest against the stop means 10 or rather the stop surfaces 11 on said stop means in the guide means 5, for moving the elements 1 apart a second distance (FIGS. 4 and 9) corresponding preferably with the abovementioned 50 mm for removal of the finished products.

The driving device 9 and feed device 17, as well as the heating and/or cooling means 20, are connected with a central unit (not shown) for attaining a fully automatized operation, in which central unit the time for the various steps in the method which the device carries through, the amount of injected product material, the amount of supplied heat or cold, temperature values, the distances for the various types of moving apart and bringing together the elements etc., are stored and by means of which central unit said parameters are adjusted.

The device according to the invention is assembled and used as follows:

An optional number of elements 1 are located close to each other, i.e. are here stacked above or on top of each other in the device by unscrewing the limit stop 8 on the guide means 5 and remove it from the stop means 10 so that the grooves 13 therein are exposed, whereafter the elements are mounted by inserting the fingers 14 on the guide portions 4 of the elements into the grooves 13 in the stop means 10. The elements 1 are mounted in the correct order, i.e. so that the stop members 12 of the guide portions 4 are longer and the prestressing of the distance-providing means 21 less the higher up in the stack the element is located. If the entire capacity of the device is not utilized so that the number of elements 1 mounted is less than there is room for in the device, it is advantageous to, so to say, "fill it from above" and build downwards when the number of elements shall be enlarged, since the distance of displacement of the driving device 9 during operation thereby decreases. Is the number of elements 1 in the device relatively large and the number of elements 1 to be "filled" relatively small, it is possible to, as shown, for not first having to remove elements already mounted in the device, first locate the guide portions 4 on the stop means 10 of the guide means 5 and thereafter insert the element 1 between the guide portions and connect said guide portions with the element by screwing the screws 6 into the screw holes in the element. If desired, at least the upper side 1a of the uppermost element 1, facing the limit stop 8, and the lower side 1b of the lowermost element 1, facing the vertically displaceable member 23 of the driving device 9, can be smooth and level, as stated above. In practice, this is the case only when the capacity of the device is fully utilized. However, the intermediate elements 1 can also be smooth and planar on one side; but two planar element sides should of course not be engaging each other. Even if the elements in principal are turnable, the elements ought to be located thereby with the side with the recess 2 facing upwards or, if both sides 1a, 1b have one or more recesses 2, with the groove 18 in the feed portion 16 of each element facing upwards.

If there are grooves 18 in both sides 16a, 16b of the feed portion or e.g. a passage through said portion which thereafter branch off or several passages, the elements can be mounted with any side facing upwards. When, as in the embodiment shown, elements 1 with recesses on both sides 1a, 1b are used, the recesses in element sides facing each other should in principal match each other regarding the number, shape and arrangement of said recesses. Modifications thereof however, are possible.

After mounting the elements 1, the limit stop 8 is screwed on again. An assembled device, ready for use, is shown in FIG. 5. Thus, in the starting position illustrated here, the stop members 12 on the guide portions 4 of the elements 1 rest against the stop surfaces 11 on the stop means 10 of the guide means 5, whereby the elements 1 are kept apart from each other said second distance of preferably about 50 mm. Alternatively, during assembly with the driving device 9 displaced upwards, the elements 1 can be located on the member 23 of said device 9 and then on top of each other in the desired number and in correct order, so that only the distance-providing means 21 through their prestressing keep the elements separated from each other said first distance of preferably about 1 mm. It is however, during assembly according to FIG. 5, easier to control that the elements 1 have been mounted in the correct order.

The method for manufacturing the products continues after mounting the elements by bringing said elements, located close to each other or stacked above or on top of each other, together by pressing them against the limit stop 8 by means of the displaceable member 23 of the driving device 9 with a force which exceeds the prestressing of the distance-providing means 21. The displacement of the member 23 is for this purpose adjustable by e.g. controlling the operating time of the driving device 9. The position after bringing the elements together is shown in FIG. 6.

After the elements 1 have been brought together, the feed device 17 is now moved to the position according to FIG. 7 with the spray nozzles 19 on the feed device inserted into the grooves 18 or passages in the feed portions of the elements. The feed device 17, which is constructed in a suitable manner to permit simultaneous injection of the product material in more or less liquid state in all the product-forming spaces 3 defined between the elements 1 during the bringing together thereof, is activated and said spaces 3 filled with product material. The amount of injected product material is adjusted with regard to the number of spaces 3 and their size. Adjustment occurs preferably by adjusting the time of activation of the feed device 17, but may occur also in other ways. After the injection of the product material is terminated, the feed device 17 returns to its rest position, i.e. the injection or spray nozzles 19 are withdrawn from the grooves 18 or passages in the feed portions 16 of the elements 1.

Not necessarily, but preferably and then substantially at the same time or immediately after the injection of product material into the spaces 3 between the elements 1 has begun, said elements are moved apart to permit swelling of the injected product material while the products are formed, i.e. while the product material is heated or cooled to final solid state. A suitable separation distance thereafter is said first distance of about 1 mm, which in the illustrated preferred embodiment is attained while the pressure from the driving device 9 on the elements 1 from below against the limit stop 8 ceases and the displaceable member 23 of the driving device 9 is retracted to such a degree that the prestressing of the distance-providing means 21 can be developed. The position after this first separation is illustrated in FIG. 8.

Immediately after or in connection with the injection of the product material in the spaces 3 between the elements 1 and thereby eventually also simultaneously with or immediately after said first separation, the elements 1 are supplied with heat or cold for forming products by heating or cooling the product material in said spaces between said elements. Heat is supplied preferably by activating a source of current so that the heating coils 20 are heated and in turn heat the material the elements 1 are made of. Cooling occurs in a corresponding way by feeding cooling medium into pipes in the elements 1, whereby the element material is cooled.

Supplied heat or cold is adjusted with regard to the amount and type of product material to be heated/cooled. When large numbers or amounts of products shall be produced, the heat or cold supply is preferably continuous during the entire method. Supplied heat or cold can then be kept under control by means of sensors (not shown) which see to that the elements 1 all the time are at a highest alternatively lowest temperature.

When the products are finished, the elements 1 are moved apart to the position according to FIG. 9 to permit access to the products. A suitable separating distance for this purpose is said second distance of preferably about 50 mm. This distance is reached while the guide portions 4 on the elements 1, or rather the stop members 12 of said guide portions 4, are brought into engagement, in the embodiment shown from above, with the stop means 10 in the guide means 5 of the device according to the invention, or rather the stop surfaces 11 of said stop means 10. The engagement of the guide portions 4 with the stop means 10 is obtained by further withdrawal or retraction of the displaceable member 23 of the driving device 9. Said first distance of preferably about 1 mm as well as said second distance of preferably about 50 mm can be varied if desired or required and adjustment occurs by activating the driving device 9 as long as necessary to permit displacement of the displaceable member 23 of said driving device 9 said first and second distances.

After said second separation of the elements 1, the products are removed from the device, which then is ready for manufacturing a new batch or charge of products. The entire manufacturing process is carried through, as stated above, preferably automatically, and the process or method is thereby supervised and controlled by e.g. said central unit, in which inter alia the time for the various process steps, the amount of injected product material, the amount of supplied heat or cold, temperature values, the distances of separation or for moving apart and for bringing together the elements and eventual other important parameters for the process or method can be stored and adjusted when required or desired.

It is obvious for a skilled person that beyond what is defined above, the method and device according to the invention can be altered and modified within the scope of the following claims without departing from the idea and purpose of the invention. Thus, the elements 1 in the device can have another shape than round, e.g. square, and consist of any suitable heat conducting material, e.g. of aluminum with recesses dressed with teflon. The arrangement of guide and feed portions on the elements can also be different, as can the location and design of the heating and/or cooling means. The illustrated device is placed vertically, but horizontal position with the elements on end is also possible. The number of elements may vary as stated above and there is no upper limit other than for practical reasons. Furthermore, the number, shape and location of the limit stop and stop means forming part of the guide means may vary. The frame member on which the device according to the invention is placed, can be a table or similar and the device is designed in a suitable way (screw joints 25) for secure attachment thereto. The motors for the driving device and feed device for displacement thereof is thereby preferably mounted under the table or frame member of another type, as are eventual pumps or other feed means for the product material and preferably also containers for the product material or other members from which the product material can be fed. The frame member and table may also be provided with a hole, over which the device according to the invention can be mounted in its vertical position, so that the adjustable member of the driving device with the rod can be moved upwards into the device from below through said hole. The construction of the driving and feed devices may also vary.

We claim:

1. A method for manufacturing food products, where a food product material, initially in a substantially liquid state, is fed into a device and through the supply of heat or cold is given its final, substantially solid state, comprising the steps of:

locating elements between which the food products are to be formed close to each other in the device;

bringing together said elements located close to each other;

injecting the food product material into product-forming spaces defined between said elements during the bringing together thereof;

supplying heat or cold to said elements for forming the products by heating or cooling the product material in said spaces between said elements;

moving said elements apart a first distance to permit swelling of injected product material while the products are formed;

moving said elements apart a second distance when the products are finished to provide access to the products; and removing the finished food products from said elements.

2. Method according to claim 1 further comprising the step of bringing said elements together by pressing said elements against a limit stop in the device in which said elements are located close to each other.

3. Method according to claim 2 further comprising the step of moving said elements apart said first distance to permit swelling of the product material by discontinuing the pressing force on said elements against said limit stop.

4. Method according to claim 1 further comprising the step of moving said elements apart preferably about 1 mm to permit swelling of the product material.

5. Method according to claim 1 further comprising the step of moving said elements apart said first distance substantially at the same time or immediately after initiating injection of the product material into said spaces between the elements.

6. Method according to claim 1 further comprising the step of supplying heat or cold substantially at the same time or immediately after initiating injection of the product material into said spaces between said elements.

7. Method according to claim 1 further comprising the step of moving said elements apart said second distance when the products are finished by bringing guide portions on said elements into engagement with stop means in the device in which said elements are located close to each other.

8. Method according to claim 1 further comprising the step of moving said elements apart preferably about 50 mm when the products are finished.

9. Method according to claim 1 further comprising the step of supplying heat or cold continuously during the entire method.

10. Method according to claim 1 further comprising the step of locating said elements on top of each other.

11. Method according to claim 1 further comprising the step of carrying through the entire method automatically by means of a central unit, in which the time for the various method steps, the amount of injected product material, the amount of supplied heat or cold, temperature values, distances of separation or for moving apart and for bringing together said elements are stored and adjusted.

12. Device for manufacturing a food product in which food product material, initially in a substantially liquid state, is fed into the device and through the supply of heat or cold is given its final, substantially solid state, said device comprising:

a plurality of stacked elements capable of being moved apart as well as brought together, each of said elements having at least one recess on at least one side, sides of said elements facing each other defining between them at least one product-forming space;

a guide means for guiding relative movement of said elements, said elements including guide portions which are received within and cooperate with said guide means to guide said elements while said elements are being moved apart or brought together;

each element including at least one feed portion for directing the food product material in liquid state into said space between said elements;

said elements including heating and/or cooling means for heating or cooling the food product material in said space between said elements;

a driving device for moving in a first direction to move said elements together prior to the food product material being directed into said space, said driving device being movable in a second direction opposite said first direction to allow said elements to move apart;

a limit stop against which said stack of elements is pressed by said driving device when said driving device moves said elements together;

at least one distance-providing means located between adjacent elements for moving said adjacent elements apart a first distance when said driving device moves a predetermined first distance in said second direction, said first distance being sufficient to permit swelling of the food product material in said space between said elements when the food product material is heated or cooled; and said guide means including stop means for engaging said guide portions of said elements as said driving device moves a predetermined second distance greater than said predetermined first distance in said second direction, said guide portions of said elements engaging said stop means to locate said adjacent elements in a position spaced apart a second distance greater than said first distance to allow for removal of a finished product from said space between said adjacent elements.

13. Device according to claim 12 wherein said elements are located on top of each other.

14. Device according to claim 12 wherein said elements are substantially disc shaped and have at least one recess on both sides of each element.

15. Device according to claim 12 wherein each element includes two guide portions which are located diametrically opposed on said element and which are releasably mounted thereon.

16. Device according to claim 12 wherein said guide portions of said elements include fingers which protrude into and are guided by grooves defined in said stop means in said guide means.

17. Device according to claim 12 wherein each feed portion comprises at least one groove which extends between the outer side of said element for connection with said feed device for the product material, and each recess in said element.

18. Device according to claim 12 wherein the heating and/or cooling means consists of coils of heat conducting material and/or pipes for cooling medium, located in each element.

19. Device according to claim 12 wherein said distance providing means of said elements consist of spring means which are secured in each element and protrude therefrom, and which are adapted to separate said element on which they are secured said first distance from said element located thereabove.

20. Device according to claim 19 wherein each spring means consists of a spring which is located in a seat in each guide portion on said element and which engage the corresponding guide portion on said element immediately thereabove.

21. Device according to claim 19 further comprising a prestressing of said spring means which varies in dependence of the number of elements located thereabove.

22. Device according to claim 19 wherein said prestressing of said spring means is such that all of said elements are kept apart about 1 mm from each other by said spring means.

23. Device according to claim 12 wherein said guide portion of said elements each include a stop member which during separation of said elements said second distance is brought into engagement with a stop surface on said stop means in said guide means.

24. Device according to claim 23 wherein said stop means is stepped and has a stop surface on each step, and that said stop members of said guide portions are defined by protruding flanges of different length for engagement with said stop surfaces on said stop means.

25. Device according to claim 23 wherein said stop members of said guide portions on said elements are brought into engagement from above with said stop surfaces on said stop means and rest thereon with the entire weight of said respective element.

26. Device according to claim 23 wherein said stop surfaces of said stop means are situated at such distance from each other that the distance between said elements, when said stop members on said guide portions thereof engage said stop surfaces, is about 50 mm.

27. Device according to claim 12 wherein said limit stop, against which said elements are pressed with the force from said distance-providing means, comprises a stopping portion situated at the top of said guide means, whereby said elements from below are pressed against said stopping portion by means of said driving device.

28. Device according to claim 27 wherein said driving device comprises a motor-driven, vertically displaceable and with the lowermost element engageable member.

29. Device according to claim 28 wherein said driving device and said feed device as well as said heating and/or cooling means are connected with a central unit, wherein the time for the various method steps, the amount of food product material, the amount of supplied heat or cold, temperature values, the distances of separation or for moving apart and for bringing together said elements are adjustably stored.

* * * * *